United States Patent
Inglis et al.

(10) Patent No.: US 11,347,653 B2
(45) Date of Patent: May 31, 2022

(54) PERSISTENT STORAGE DEVICE MANAGEMENT

(71) Applicant: Nyriad Limited, Cambridge (NZ)

(72) Inventors: Stuart John Inglis, Cambridge (NZ); Sheridan John Lambert, Cambridge (NZ); Timothy Kelly Dawson, Cambridge (NZ); Xavier Aldren Simmons, Cambridge (NZ); Alexander Kingsley St. John, Cambridge (NZ)

(73) Assignee: Nyriad, Inc., Dover, DE (US)

( * ) Notice: Subject to any disclaimer, the term of this patent is extended or adjusted under 35 U.S.C. 154(b) by 104 days.

(21) Appl. No.: 16/544,605

(22) Filed: Aug. 19, 2019

(65) Prior Publication Data

US 2020/0073818 A1 Mar. 5, 2020

Related U.S. Application Data

(60) Provisional application No. 62/746,981, filed on Oct. 17, 2018, provisional application No. 62/725,691,
(Continued)

(51) Int. Cl.
*G06F 12/00* (2006.01)
*G06F 12/06* (2006.01)
(Continued)

(52) U.S. Cl.
CPC .............. *G06F 12/10* (2013.01); *G06F 3/065* (2013.01); *G06F 3/0607* (2013.01);
(Continued)

(58) Field of Classification Search
CPC ........ G06F 12/12; G06F 3/0607; G06F 3/065; G06F 9/30123; G06F 9/3877;
(Continued)

(56) References Cited

U.S. PATENT DOCUMENTS 5,459,857 A * 10/1995 Ludlam ............... G06F 11/2071
714/6.12
6,467,016 B1 * 10/2002 Kanai ..................... G11C 7/16
711/103
(Continued)

FOREIGN PATENT DOCUMENTS

| CN | 104410725 A | 3/2015 |
| CN | 107102957 A | 8/2017 |
| WO | 2012052800 A1 | 4/2012 |

OTHER PUBLICATIONS

Foreign Communication From a Related Counterpart Application, Extended European Search Report dated Jan. 16, 2020, European Application No. 19194744.9 filed on Aug. 30, 2019.
(Continued)

*Primary Examiner* — Shawn X Gu
*Assistant Examiner* — Mohammad S Hasan

(57) ABSTRACT

A method comprising: receiving a request to write data at a virtual location; writing the data to a physical location on a persistent storage device; and recording a mapping from the virtual location to the physical location; wherein the physical location corresponds to a next free block in a sequence of blocks on the persistent storage device.

18 Claims, 10 Drawing Sheets

Related U.S. Application Data filed on Aug. 31, 2018, provisional application No. 62/725,703, filed on Aug. 31, 2018.

(51) Int. Cl.

| | | |
|---|---|---|
| *G06F 12/10* | (2016.01) | |
| *G06F 11/10* | (2006.01) | |
| *G06F 12/12* | (2016.01) | |
| *G06F 12/0815* | (2016.01) | |
| *G06F 12/02* | (2006.01) | |
| *G06F 3/06* | (2006.01) | |
| *G06F 9/38* | (2018.01) | |
| *G06F 9/30* | (2018.01) | |
| *G06F 12/14* | (2006.01) | |

(52) U.S. Cl.
CPC ...... *G06F 9/30036* (2013.01); *G06F 9/30123* (2013.01); *G06F 9/3877* (2013.01); *G06F 11/1004* (2013.01); *G06F 11/1088* (2013.01); *G06F 12/0246* (2013.01); *G06F 12/0815* (2013.01); *G06F 12/12* (2013.01); *G06F 12/1408* (2013.01); *G06F 3/0679* (2013.01); *G06F 2212/1052* (2013.01); *G06F 2212/657* (2013.01)

(58) Field of Classification Search
CPC ............. G06F 11/1004; G06F 11/1088; G06F 12/0246; G06F 12/0815; G06F 12/1408; G06F 3/0679; G06F 2212/1052; G06F 2212/657

See application file for complete search history.

(56) References Cited

U.S. PATENT DOCUMENTS

| | | | |
|---|---|---|---|
| 9,092,152 B1 | 7/2015 | Piszczek et al. | |
| 9,158,927 B1 | 10/2015 | Franklin et al. | |
| 9,164,702 B1* | 10/2015 | Nesbit | G06F 15/17331 |
| 9,268,640 B1 | 2/2016 | Foley et al. | |
| 9,639,457 B1 | 5/2017 | Piszczek et al. | |
| 9,823,968 B1 | 11/2017 | Fugini et al. | |
| 10,739,996 B1* | 8/2020 | Ebsen | G06F 3/064 |
| 2004/0123032 A1 | 6/2004 | Talagala et al. | |
| 2007/0168632 A1* | 7/2007 | Zeevi | G06F 12/0246 |
| | | | 711/165 |
| 2008/0086620 A1* | 4/2008 | Morris | G06F 12/1072 |
| | | | 711/203 |
| 2009/0268903 A1 | 10/2009 | Bojinov et al. | |
| 2011/0126045 A1 | 5/2011 | Bennett | |
| 2012/0268469 A1 | 10/2012 | Shchepetov et al. | |
| 2013/0016109 A1 | 1/2013 | Garanzha | |
| 2013/0067174 A1* | 3/2013 | Moss | G06F 11/1471 |
| | | | 711/154 |
| 2014/0325117 A1* | 10/2014 | Canepa | G06F 12/0246 |
| | | | 711/103 |
| 2015/0205663 A1 | 7/2015 | Sundaram et al. | |
| 2017/0061566 A1 | 3/2017 | Min et al. | |
| 2017/0132151 A1 | 5/2017 | Bakke et al. | |
| 2017/0147516 A1 | 5/2017 | De | |
| 2017/0228313 A1* | 8/2017 | Boitei | G06F 3/0679 |
| 2017/0272209 A1 | 9/2017 | Yanovsky et al. | |
| 2018/0004413 A1* | 1/2018 | Zhang | G06F 3/0655 |
| 2018/0150347 A1 | 5/2018 | Vidyapoornachary et al. | |
| 2018/0181324 A1 | 6/2018 | Danilov et al. | |
| 2019/0095123 A1* | 3/2019 | Lin | G06F 3/061 |
| 2019/0129834 A1* | 5/2019 | Purkayastha | H01L 27/11556 |
| 2019/0138445 A1* | 5/2019 | Lee | G11C 16/14 |
| 2019/0391926 A1* | 12/2019 | Lin | G06F 13/28 |

OTHER PUBLICATIONS

Foreign Communication From a Related Counterpart Application, Partial European Search Report dated Jan. 30, 2020, European Application No. 19194748.0 filed on Aug. 30, 2019.

Anujan Varma et al: "Destage algorithms for disk arrays with non-volatile caches", ACM SIGARCH Computer Architecture News, ACM Special Interest Group on Computer Architecture, 2 Penn Plaza, Suite 701 New York NY 10121-0701 USA, vol. 23, No. 2, May 1, 1995 (May 1, 1995), pp. 83-95, XP058084661, ISSN 0163-5964, DOI: 10.1145/225830.224042.

Anonymous: "CUDA 2.2 Pinned Memory APIs", Mar. 1, 2009 (Mar. 1, 2009), XP055655605, Retrieved from the Internet: URL: https://devtalk.nvidia.com/cmd/default/download-comment-attachment/50683/ [retrieved on Jan. 8, 2020].

Foreign Communication From a Related Counterpart Application, Extended European Search Report dated Jan. 27, 2020, European Application No. 19193027.0 filed on Aug. 22, 2019.

Inglis, Stuart John, et al., "Block Device Interface Using Non-Volatile Pinned Memory," filed Aug. 30, 2019, U.S. Appl. No. 16/556,575 [NYR050 / P13471US01].

Simmons, Xavier Aldren, et al., "Vector Processor Storage," filed Aug. 30, 2019, U.S. Appl. No. 16/556,711.

R.A. Patel, et al., "Parallel lossless data compression on the GPU" 2012 Innovative Parallel Computer (InPar), 2012.

M.L. Curry, "A highly reliable GPU based RAID system", (Doctoral dissertation), pp. 1-141, 2010.

Office Action dated Sep. 25, 2020, U.S. Appl. No. 16/556,575, filed Aug. 30, 2019.

Final Office Action dated Jan. 13, 2021, U.S. Appl. No. 16/556,575, filed Aug. 30, 2019.

Office Action dated Apr. 22, 2021, U.S. Appl. No. 16/556,575, filed Aug. 30, 2019.

Notice of Allowance dated Feb. 18, 2021, U.S. Appl. No. 16/556,711, filed Aug. 30, 2019.

\* cited by examiner

|  | 0 | 1 | 2 | 3 | 4 | 5 | 6 | 7 | HEAD | MAP |
|---|---|---|---|---|---|---|---|---|---|---|
| 200 |  |  |  |  |  |  |  |  | 0 |  |
| 201 | a<br>h(a) |  |  |  |  |  |  |  | 1 | 6→0 |
| 202 | a<br>h(a) | b<br>h(b) |  |  |  |  |  |  | 2 | 6→0<br>3→1 |
| 203 | a<br>h(a) | b<br>h(b) | c<br>h(c) |  |  |  |  |  | 3 | 6→0<br>3→1<br>2→2 |
| 204 | a<br>h(a) | ~~b<br>h(b)~~ | c<br>h(c) | b'<br>h(b') |  |  |  |  | 4 | 6→0<br>3→3<br>2→2 |

FIG. 2

|     | 0 | 1 | 2 | 3 | 4 | 5 | 6 | 7 | HEAD | MAP |
|-----|---|---|---|---|---|---|---|---|------|-----|
| 400 Drive 0 |   |   |   |   |   |   |   |   | 0 |   |
| Drive 1 |   |   |   |   |   |   |   |   |   |   |
| Drive 2 |   |   |   |   |   |   |   |   |   |   |
| Drive 3 |   |   |   |   |   |   |   |   |   |   |
| Drive 4 |   |   |   |   |   |   |   |   |   |   |

|     | 0 | 1 | 2 | 3 | 4 | 5 | 6 | 7 | HEAD | MAP |
|-----|---|---|---|---|---|---|---|---|------|-----|
| 401 Drive 0 | a / h(a) |   |   |   |   |   |   |   | 0 | 6→0:0 |
| Drive 1 |   |   |   |   |   |   |   |   |   |   |
| Drive 2 |   |   |   |   |   |   |   |   |   |   |
| Drive 3 |   |   |   |   |   |   |   |   |   |   |
| Drive 4 |   |   |   |   |   |   |   |   |   |   |

|     | 0 | 1 | 2 | 3 | 4 | 5 | 6 | 7 | HEAD | MAP |
|-----|---|---|---|---|---|---|---|---|------|-----|
| 402 Drive 0 | a / h(a) |   |   |   |   |   |   |   | 0 | 6→0:0<br>6→1:0 |
| Drive 1 | b / h(b) |   |   |   |   |   |   |   |   |   |
| Drive 2 |   |   |   |   |   |   |   |   |   |   |
| Drive 3 |   |   |   |   |   |   |   |   |   |   |
| Drive 4 |   |   |   |   |   |   |   |   |   |   |

FIG. 4A

|  | 0 | 1 | 2 | 3 | 4 | 5 | 6 | 7 | HEAD | MAP |
|---|---|---|---|---|---|---|---|---|---|---|
| 403 Drive 0 | a h(a) | | | | | | | | 0 | 6→0:0 3→1:0 2→2:0 |
| Drive 1 | b h(b) | | | | | | | | | |
| Drive 2 | c h(c) | | | | | | | | | |
| Drive 3 | | | | | | | | | | |
| Drive 4 | | | | | | | | | | |

|  | 0 | 1 | 2 | 3 | 4 | 5 | 6 | 7 | HEAD | MAP |
|---|---|---|---|---|---|---|---|---|---|---|
| 404 Drive 0 | a h(a) | | | | | | | | 1 | 6→0:0 3→1:0 2→2:0 |
| Drive 1 | b h(b) | | | | | | | | | |
| Drive 2 | c h(c) | | | | | | | | | |
| Drive 3 | d h(d) | | | | | | | | | |
| Drive 4 | e h(e) | | | | | | | | | |

|  | 0 | 1 | 2 | 3 | 4 | 5 | 6 | 7 |
|---|---|---|---|---|---|---|---|---|
| Drive 0 | a h(a) | cd h(cd) | f h(f) | g h(g) | ij h(ij) | l h(l) | | |
| Drive 1 | b h(b) | c h(c) | ef h(ef) | h h(h) | i h(i) | kl h(kl) | | |
| Drive 2 | ab h(ab) | d h(d) | e h(e) | gh h(gh) | j h(j) | k h(k) | | |

901

|  | 0 | 1 | 2 | 3 | 4 | 5 | 6 | 7 |
|---|---|---|---|---|---|---|---|---|
| Drive 0 | a h(a) | cd h(cd) | f h(f) | g h(g) | ij h(ij) | l h(l) | b h(b) | |
| Drive 1 | b h(b) | c h(c) | ef h(ef) | h h(h) | i h(i) | kl h(kl) | | |
| Drive 2 | ab h(ab) | d h(d) | e h(e) | gh h(gh) | j h(j) | k h(k) | | |

902

|  | 0 | 1 | 2 | 3 | 4 | 5 | 6 | 7 |
|---|---|---|---|---|---|---|---|---|
| Drive 0 | a h(a) | cd h(cd) | f h(f) | g h(g) | ij h(ij) | l h(l) | b h(b) | |
| Drive 1 | b h(b) | c h(c) | ef h(ef) | h h(h) | i h(i) | kl h(kl) | e h(e) | |
| Drive 2 | ab h(ab) | d h(d) | e h(e) | gh h(gh) | j h(j) | k h(k) | be h(be) | |

FIG. 9

PERSISTENT STORAGE DEVICE MANAGEMENT

CROSS-REFERENCE TO RELATED APPLICATIONS

The present application claims priority to U.S. Provisional Application No. 62/746,981, filed Oct. 17, 2018. The present application also claims priority to U.S. Provisional Application No. 62/725,703, filed Aug. 31, 2018. The present application also claims priority to U.S. Provisional Application No. 62/725,691, filed Aug. 31, 2018, all of which are incorporated herein by reference in their entirety for all purposes.

FIELD

This relates to persistent storage device management.

BACKGROUND

Data may be stored on a persistent storage device, such as a hard drive, which has a number of blocks. A request to write data to the drive may specify a physical location (such as a block) of the persistent storage device at which to write the data. A request to read data from the drive may specify a physical location (such as a block) of the persistent storage device from which to read the data.

SUMMARY

In a first example embodiment, there is provided a method comprising: receiving a request to write data at a virtual location; writing the data to a physical location on a persistent storage device; and recording a mapping from the virtual location to the physical location; wherein the physical location corresponds to a next free block in a sequence of blocks on the persistent storage device.

BRIEF DESCRIPTION

The description is framed by way of example with reference to the drawings which show certain embodiments. However, these are provided for illustration only.

FIG. 2 shows a worked example of the approach of FIG. 1.

FIGS. 4A and 4B show a worked example of the approach of FIG. 3.

FIG. 9 shows a worked example of the approach of FIG. 8.

DETAILED DESCRIPTION

In some embodiments, there is provided a method for a driver to receive a request to write data at a virtual location, writing data at the next free physical location in sequence, and recording a mapping between the virtual and physical locations. By always storing data on a next free block on the disk, this can be used to avoid a disk going through a read-modify-write cycle. This can improve throughput and write speed.

In this case, "next" may refer to the next in a sequence of blocks. The sequence may be determined based on the configuration of the particular persistent storage device. For example, "next" may be based, at least in part, on the block having the lowest expected seek time from the current block.

This method may be implemented via a driver. The driver may provide a functionality to write data, read data, and update data. In this way, the driver provides all the necessary functionality for a block device, such as a persistent storage device. In particular, the driver may be a userspace application which receives system calls from a kernel module and in turn writes data to the underlying persistent devices.

Writing

Figure 1:
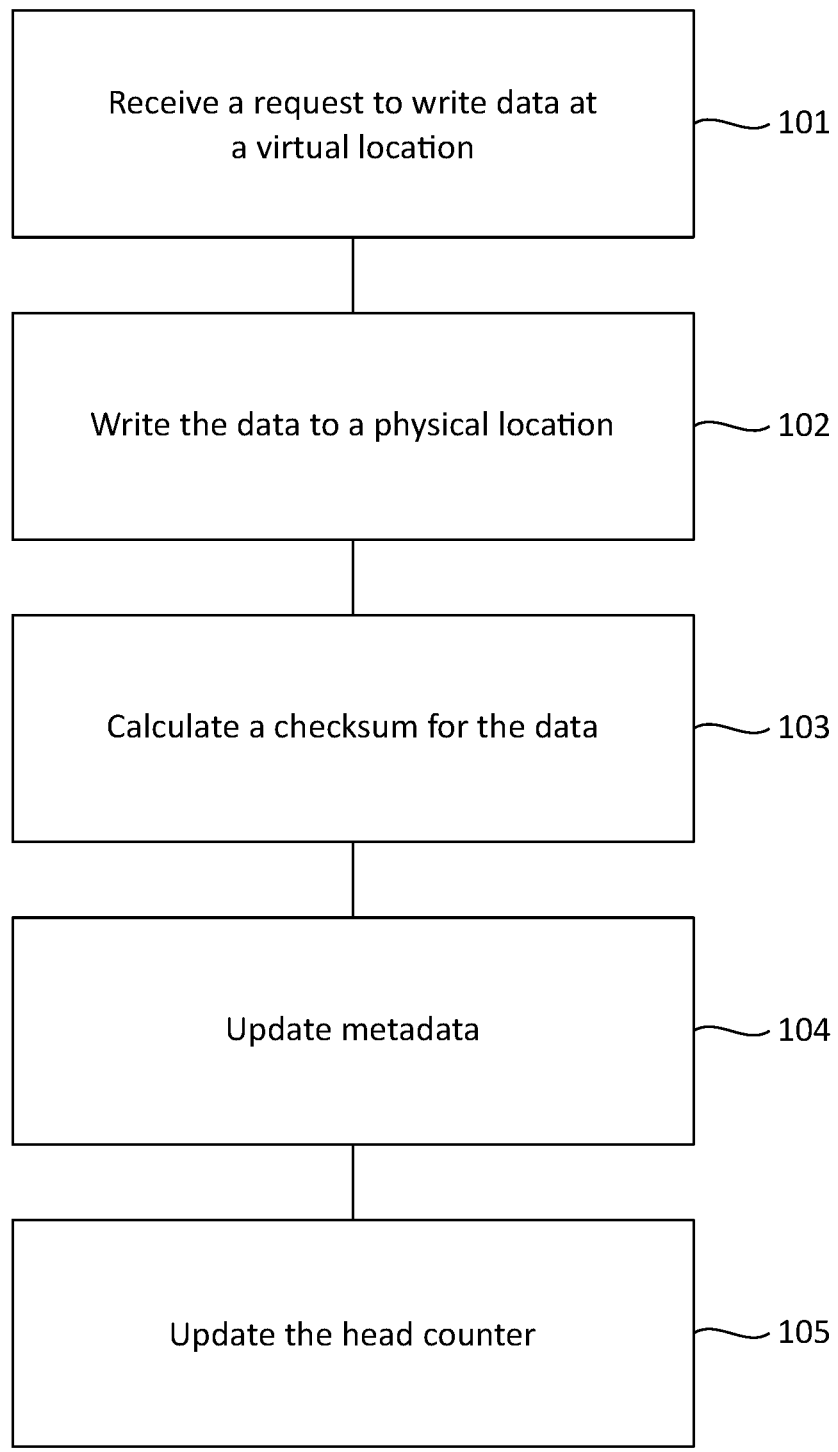
FIG. 1 shows an example approach for handling a write request.

FIG. 1 shows an example approach for the driver handling a write request to a persistent storage device, such as a hard drive. This may be implemented in a driver running on a system.

At step 101, a request is received to write data at a first location of the persistent storage device. The request may be received by a function call of the driver. The request may comprise the data or may comprise a pointer to where the data may be retrieved from (for example, a memory address).

The first location is a virtual location, since it may not correspond to a physical location on a persistent device. However, the first location is structured as if it were a physical location, since the redirection by the driver is hidden from a user of the driver. The request may therefore comprise an identifier of the first location, such as a block index and disk identifier. A subsequent request to read the data from the virtual location should therefore return the same data irrespective of the physical location of the data.

In some cases, the data may be part of a stream of data. A request to write data is therefore received (or treated as being received) for each block in the stream.

At step 102, the data is written to a second location. The second location is a physical location which corresponds to a block on the persistent storage device. However, this may be different from any block indicated by the virtual location. The virtual location may not be correlated with the physical location.

In particular, the physical location may be a head of the persistent storage device, that is, the next free block of the persistent storage device or a sequence of next free blocks of the persistent storage device. This can be recorded at the persistent storage device by a head counter which records the index of the next free block of the persistent storage device. A free block is a block in which no data is stored, or if data is stored, there is no need for that data to be retrievable. In this way, the block is appended to the sequence of blocks which have already been written.

By writing to a next free block (which, by definition, is free), there is no need to determine whether the data at the indicated block has changed. This avoids the need to initially read from the block, and therefore can result in improved performance.

Moreover, because the physical location need not be correlated with the virtual location, there is no need for the requestor (such as a program) to determine where the next free block is to achieve this. The function of a location as a label to retrieve data is decoupled from the function of a location as a mechanism for managing a persistent storage device. These functions are performed by the virtual location and the physical location respectively.

At step 103, a checksum for the data at the block indicated by the physical location is calculated. The checksum may be a cryptographic hash. This can be used to verify that data subsequently retrieved from the block is the same as the data stored at the block. In some cases, the checksum may comprise parity information which can correct some errors in the block.

At step 104, metadata for the persistent storage device is updated.

The metadata comprises a mapping from the virtual location to the physical location. This links the virtual location (which the requestor or another process can use to indicate the intended data to be retrieved) to the physical location (where the actual data is stored). The metadata further comprises the checksum for each block.

The metadata may be stored on the persistent storage device. For example, this may be a predetermined part of the persistent storage device. Additionally or alternatively, the metadata is stored on a separate persistent storage device which may be optimized for use as a cache.

In some cases, updating metadata for the block comprises determining if metadata for the block indicated by the first location already exists. If it exists, the original metadata may be updated, and replacement metadata inserted (or the new metadata overwritten on the original metadata). This can prevent the metadata having multiple entries for the same data. The physical location corresponding to the previous location may be marked as dirty, indicating that it is free to be written over.

At step 105, the head counter is updated to reflect the next free block.

This may comprise incrementing the head counter to the next block in the sequence of blocks of the persistent storage device (or wrapping around to the first block, once the final block has been reached). However, in some cases, certain blocks may be skipped (for example, if they correspond to faulty portions of the persistent storage device or if the persistent storage device is missing).

This may involve calculating a tail. The tail may correspond to the earliest block in the sequence of blocks before the head where there has been data written. The earliest block may not have the lowest index. If the incremented head counter is equal to the tail, this indicates that the nominal next free block indicated by the head counter is actually not free: it has data written to it. In this case, a notification, warning, or error may be raised and/or a garbage collection process may be performed. An example garbage collection process is shown with reference to FIG. 8. Until the garbage collection process is completed, the driver may refuse to handle any more requests to write data.

Alternatively, the tail may be the location at which data could be written sequentially. In some cases, this may correspond to a garbage collected region.

In some cases, the tail may be recorded as a tail counter which is updated based on a garbage collection procedure.

This approach provides a high-performance approach to writing data to persistent storage device, since the read—modify—write cycle of some conventional write approaches may be avoided. In addition, because data is written sequentially, this typically results in a faster write speed.

A further benefit is that the lifespan of persistent storage devices may be prolonged using the current approach. In conventional approaches, when a single block fails or reaches its maximum number of writes, the whole device is often replaced. For example, in the case of a hard disk, a single hot-spot (corresponding to one physical address) can cause a persistent storage device to reach the end of its life even if the bulk of the persistent storage device has never been written to. However, in the current approach, the head moves across the whole persistent storage device. Because data is always written to the head, this will naturally lead to equal levels of writing across the persistent storage device. That is, each block will generally be written to once before any block is written to a second time, irrespective of the virtual address of the data being written. This approach therefore may avoid premature wearing of persistent storage devices.

Example of Writing

FIG. 2 shows a worked example of how the approach shown in FIG. 1 can be used to write a stream of data to a persistent storage device. In FIG. 2, the driver writes data to a single persistent storage device (such as a hard drive).

At 200, the system is shown in its initial state. The head counter indicates location 0 as the next free block to be written to. The mapping is empty.

At 201, the driver receives a request to write data a to virtual location 6. Because the head counter indicates physical location 0 as the next free block, data a is written at physical location 0, along with a checksum h(a). The mapping is updated to show a mapping from virtual location 6 to physical location 0. The head counter is incremented to physical location 1. The tail is computed to be at physical location 0, which is different from the head counter.

At 202, the driver receives a request to write data b to virtual location 3. Because the head counter indicates physical location 1 as the next free block, data b is written at physical location 1, along with a checksum h(b). The mapping is updated to show a mapping from virtual location 3 to physical location 1. The head counter is incremented to physical location 2. The tail is computed to be at physical location 0, which is different from the head counter.

At 203, the driver receives a request to write data c to virtual location 2. Because the head counter indicates physical location 2 as the next free block, data c is written at physical location 2, along with a checksum h(c). The mapping is updated to show a mapping from virtual location 2 to physical location 2. The head counter is incremented to physical location 3. The tail is computed to be at physical location 0, which is different from the head counter.

At 204, the driver receives a request to write data b' to virtual location 3. Because the head counter indicates physical location 3 as the next free block, data d is written at physical location 3, along with a checksum h(b'). The mapping is updated to show a mapping from virtual location 3 to physical location 3. This replaces the previous mapping from virtual location 3 to physical location 1. Physical location 1 is therefore marked as dirty and can be freed in a garbage collection process. However, the data at physical location 1 remains at physical location 1 until this garbage collection process occurs.

The head counter is incremented to physical location 4. The tail is computed to be at physical location 0, which is different from the head counter.

This example demonstrates the sequential nature of writing under the current approach. While the driver receives requests to write data at varied virtual locations, the driver actually writes in sequence. This avoids the need for the driver to read from the persistent storage device during write operations, and therefore may provide a higher performance for writing random data.

Writing to Arrays

A similar approach may be used to write data as a stripe across an array of persistent storage devices. In this way, a subset of the devices can be used for data and the remaining devices can be used for parity.

During configuration, the driver may be configured to have a particular resilience. That is, among an array of n persistent storage devices, data is stored in stripes across the data. Each stripe comprises n blocks, one of which is on each persistent storage device. Within each stripe, k of the blocks include data and m of the block are parity, such that n=k+m. Consequently, the data can be recovered if any k of the blocks within a stripe is available (whether the block are data or parity). This may be described as k+m parity. One common arrangement is 8+2 parity, where within a stripe there are 8 blocks of data and 2 blocks of parity, however any value for k and m may be used.

One approach for generating the parity data in such a scheme is to use erasure encoding. Erasure encoding is described in more detail below.

The blocks of each stripe are stored in the same indexed physical location on all of the persistent storage devices. For example, stripe 0 consists of the blocks at location 0 on every device. The driver can therefore maintain a single head counter that is common to all of the devices.

While a single head counter is described for simplicity, in practice each persistent storage device may maintain a separate head counter. This can allow for garbage collection to occur on one device while a write is occurring on another device.

It can be useful for subsequent stripes to use different drives for parity. One way to administer this is to nominate a starting drive for each stripe: stripe 0 starts at drive 0, stripe 1 starts at drive 1, and so on. This will naturally cause the parity blocks (which are written after the data blocks) to be on different drives.

Figure 3:
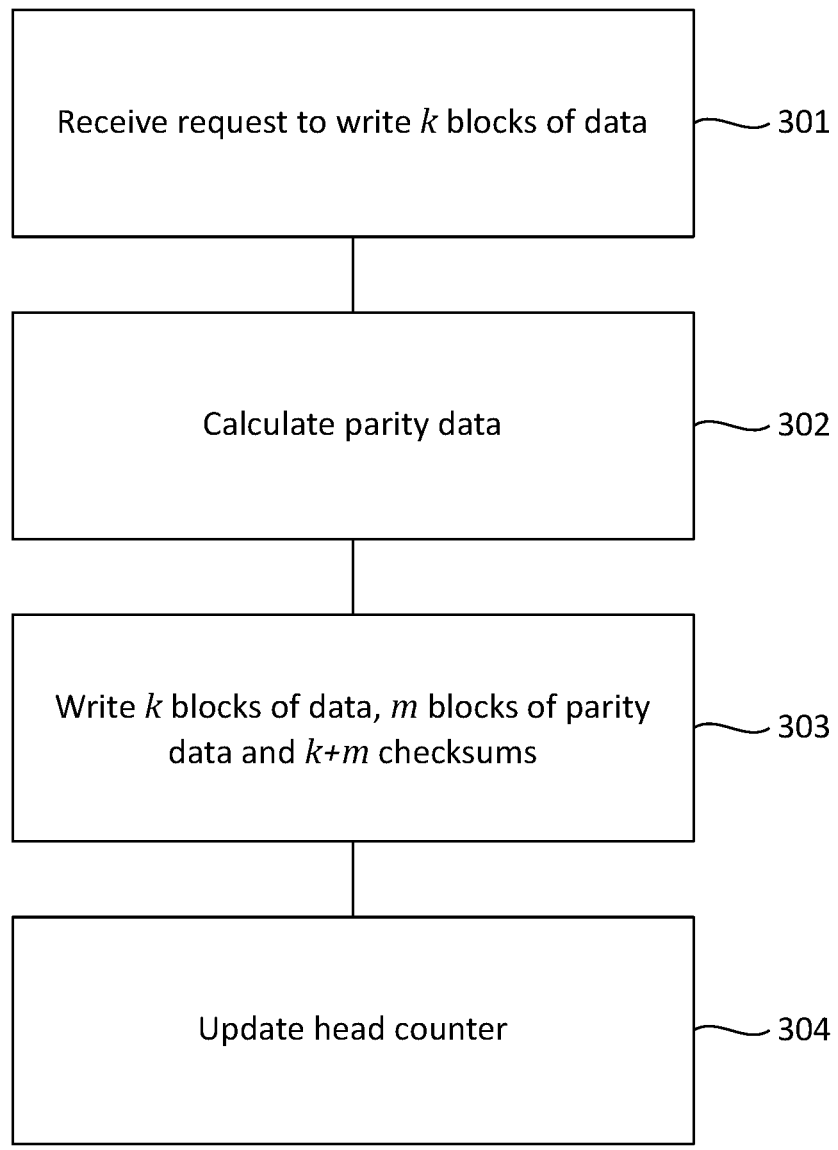
FIG. 3 shows an example approach for handling a write request where data is to be stored in stripes.

FIG. 3 shows an example approach for handling a write request where data is to be stored in such stripes. This may be implemented in a driver running on a system.

At step 301, a request to write k blocks of data is received. The request corresponds to a request received at step 101.

At step 302, after k data blocks have been received, the driver calculates parity data based on written data. This results in m blocks of parity data.

At step 303, each of the k blocks of data and m blocks of parity data is written to corresponding persistent storage devices at the physical location indicated by the head counter. This results in the stripe being completed. In addition, k+m checksums are written to the metadata, each corresponding to a block.

At step 304, the head counter is updated to reflect the physical location of the next free block at each device, in a similar manner to step 105. Once a block has been written to each persistent storage device at the physical location indicated by the head counter, the head counter may be incremented to the next free location in the sequence.

This approach provides a high-performance approach to writing data to an array of persistent storage devices, since the read—modify—write cycle of some conventional write approaches may be avoided.

This also avoids the penalty that comes with higher parity in conventional approaches. Where data can be modified, the parity must be updated after every modification. Thus, if there are two parity blocks in a stripe, modifying a piece of data requires a read—modify—write cycle for the data itself, plus two further read—modify—write cycles for each parity block. This amplification places a performance limit on the level of parity that is practical within convention systems. In practice, parity is limited to 2 in conventional systems because of this.

In contrast, the approach shown in FIG. 3 does not involve any read—modify—write cycles. Increasing parity therefore increases the overhead at a much lower rate than conventional approaches. Accordingly, parity may be almost unlimited, and in practice 2, 4, or 12 parity may be used.

Similarly, the approach shown in FIG. 3 is not limited to any particular size of array, and there may be hundreds of persistent storage devices in the array. In practice, an array having around 10 persistent storage devices may be used.

Moreover, because the number of operations at each device is relatively low, even slower persistent storage devices may provide high levels of performance.

In some cases, one device in the array may fail or otherwise be unavailable. When this occurs, a block which may have intended to be written to that device may simply be written to the next device in the array. In this manner, a failed device does not substantially impede writing.

In such cases, the system may still be said to use k+m parity. However, for each stripe, there may end up being less than k data blocks (due to the failed device) written in a stripe to maintain m blocks of parity.

Example of Writing to Arrays

FIGS. 4A and 4B shows an example process by which the approach shown in FIG. 3 can be used to write a stream of data to an array of persistent storage device. In FIGS. 4A and 4B, the driver writes data to an array of five persistent devices. The driver is configured to use 3+2 parity (that is, 2 blocks of parity for every 3 blocks of data).

At 400, the system is shown in its initial state. The head counter indicates location 0 as the next free block to be written to. The mapping is empty. Each of drives 0, 1, 2, 3, and 4 are empty.

At 401, the driver receives a request to write data a to virtual location 6. Because the head counter indicates physical location 0 as the next free block, data a is written at physical location 0 on drive 0, along with a checksum h(a). The mapping is updated to show a mapping from virtual location 6 to physical location 0 on drive 0. Because the stripe has not yet been completed, the head counter is not incremented.

At 402, the driver receives a request to write data b to virtual location 3. Because the head counter indicates physical location 0 as the next free block, data b is written at physical location 0 on drive 1, along with a checksum h(b). The mapping is updated to show a mapping from virtual location 3 to physical location 0 on drive 1. Because the stripe has not yet been completed, the head counter is not incremented.

At 403, the driver receives a request to write data c to virtual location 2. Because the head counter indicates physical location 0 as the next free block, data c is written at physical location 0 on drive 2, along with a checksum h(c). The mapping is updated to show a mapping from virtual location 2 to physical location 0 on drive 2. Because the stripe has not yet been completed, the head counter is not incremented.

Now that 3 data blocks have been written, the stripe is completed by adding parity blocks to the 2 remaining devices. The parity data is computed based on the data that has been written to the devices. This may be read from the devices, or it may be stored in memory. This results in parity data d and parity data e.

At 404, because the head counter indicates physical location 0 as the next free block, parity data d is written at physical location 0 on drive 3, along with a checksum h(d), and parity data e is written at physical location 0 on drive 4, along with a checksum h(e). In addition, now that the stripe has been completed, the head counter is incremented to the next free location in the sequence, and is now 1.

In this way, a stripe may be written without the need for the driver to read from the persistent storage device during write operations, and therefore may provide a higher performance for writing random data with any level of parity.

Reading

Figure 5:
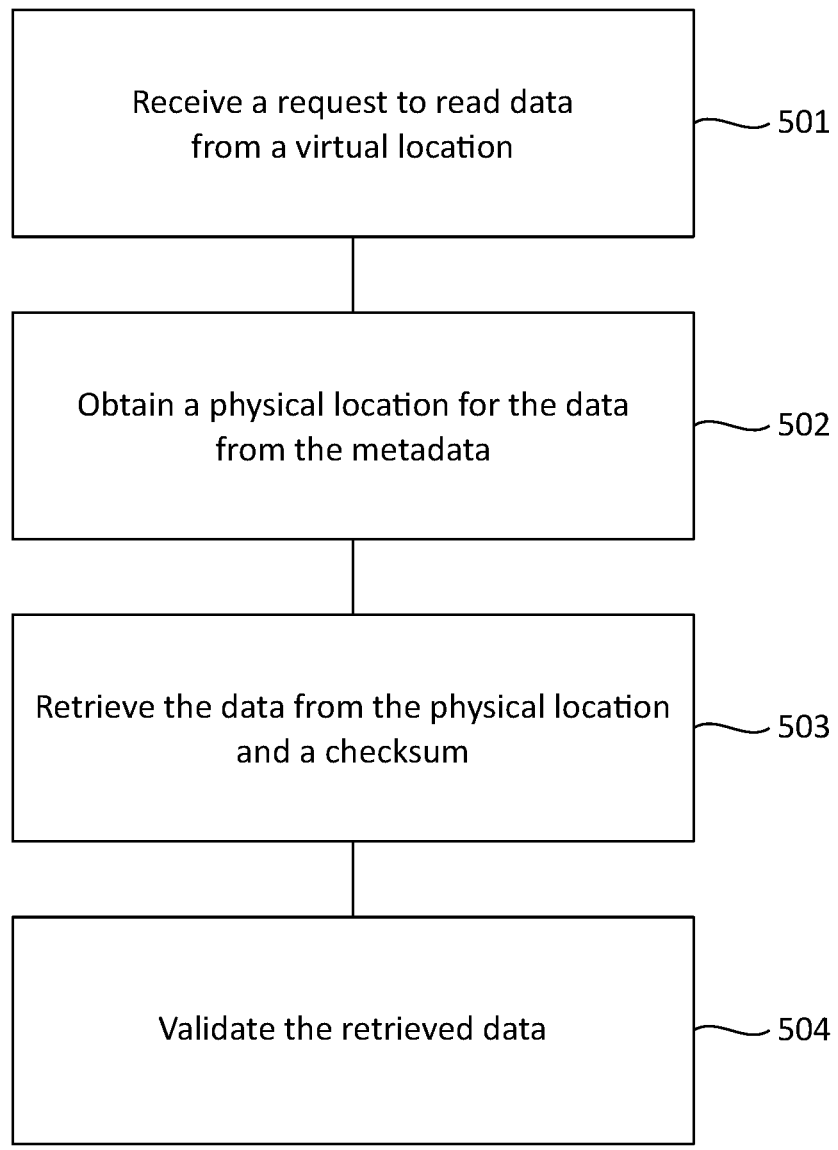
FIG. 5 shows an example approach for handling a read request.

FIG. 5 shows an example approach for handling a read request. This may be implemented in the same manner as the approach of FIG. 1.

At step 501, a request is received to read data from a virtual location. The request may be received in the same manner as the request at step 101. For example, this may be received by a function call of the driver. The request may comprise a pointer to where the data should be stored once retrieved (for example, a memory address).

At step 502, a physical location for the data corresponding to the first location is obtained from the metadata. This may be obtained by finding the virtual location in the mapping of the metadata and finding the corresponding physical location which was previously stored at step 104.

If the metadata does not contain references to the virtual location, the read request may fail, and an error may be raised.

At step 503, the data is retrieved by reading from the physical location at the appropriate permanent storage device. The data may then be stored in a memory location indicated in the request or another location.

At step 504, the retrieved data is validated to ensure that the retrieved data is the data which was originally stored. This may involve calculating a checksum for the retrieved data and comparing it to the checksum stored with the data. If the checksums match, it is highly likely the data was successfully retrieved.

If the checksums do not match, but the data can be recovered, this may be performed. This may make use of parity information stored in the same stripe as the data. If the errors cannot be corrected, a notification, warning, or error may be raised.

The retrieved data can then be returned to the process which issued the read request. This may comprise providing a success value (such as 0) as a return value to a function call.

In some cases, step 504 may be omitted. For example, on reads where it is desirable to maximize throughput, step 504 may be selectively skipped.

From the point of view of the other requestor, the data was stored at, and retrieved from, the virtual location. The management and configuration of the persistent storage device is therefore obscured from the process which attempts to read the data.

Block Reconstruction

Occasionally, it may not be possible to retrieve data at a particular physical location, or that physical location may be overly slow. This may occur if step 503 is unsuccessful due to the hardware failure of a block or device, or step 504 is unsuccessful due to retrieved, but unverified, data. When this occurs, a block reconstruction process may be undertaken.

Figure 6:
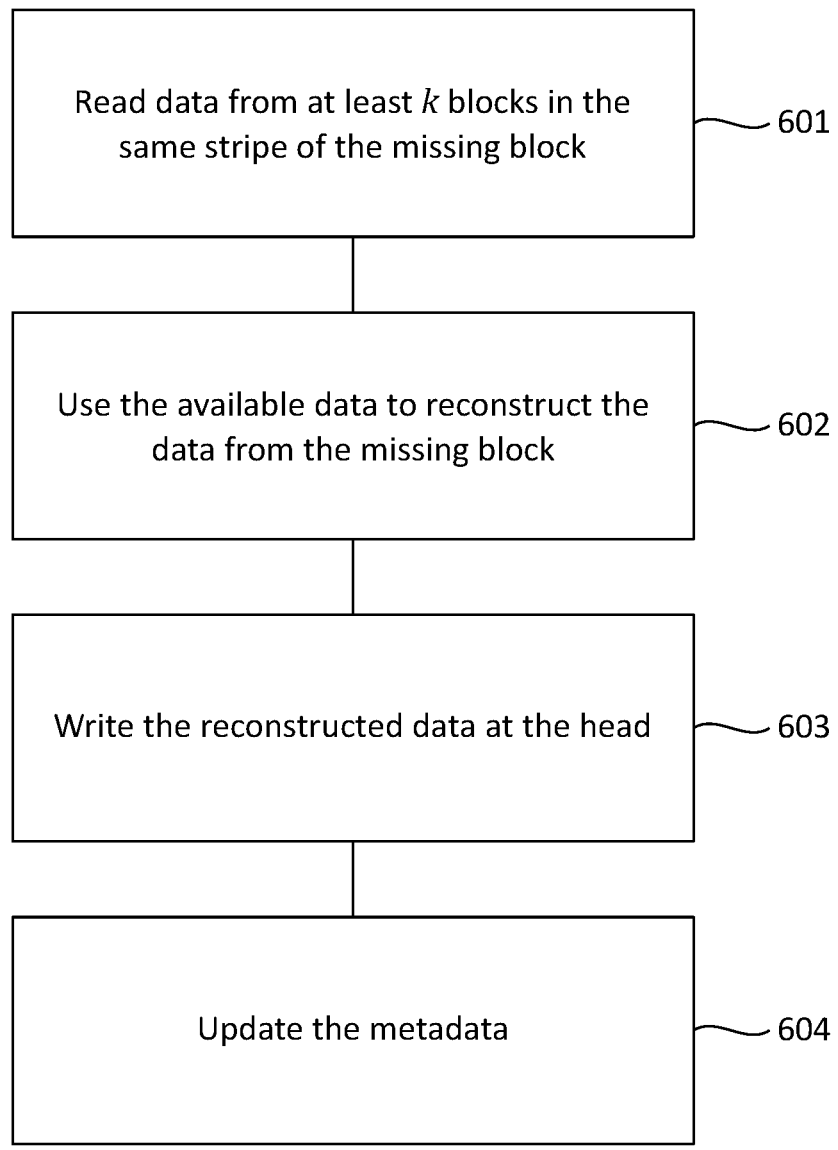
FIG. 6 shows an example approach for handling block reconstruction of a missing block.

FIG. 6 shows an example approach for handling block reconstruction of a missing block. In this example, the data is stored at an array of persistent storage devices which are configured to use k+m parity.

At step 601, the driver reads data from at least k blocks in the same stripe as the missing block. Since each block in the stripe is from a different persistent storage device, it is highly unlikely in practice that multiple blocks within a stripe will become unavailable at the same time.

At step 602, the driver uses the available data to reconstruct the data from the missing block. This is possible since, for k+m parity, any k blocks of a stripe can be used to reconstruct all the blocks within that stripe. If the blocks in a stripe have been encoded using erasure encoding to produce the parity, any missing blocks can be derived by erasure decoding, as described below.

At step 603, the reconstructed data is written at the head (that is, the next free block, as indicated by the head counter). This may be implemented in the same manner at steps 102 and 103.

At step 604, the metadata is updated such that the virtual location corresponding to the missing block is now mapped to the block at which the reconstructed data was written. The missing block can then be marked as dirty (if there is no hardware issue) or be recorded as unusable (if there is a hardware issue).

In this manner, the data can be recovered immediately after a single failed read. The block reconstruction process occurs quickly since only the failed block needs to be rewritten. This allows minimal speed loss: while there may be a slight delay in reconstructing the data after the first read, any subsequent reads will revert to the original speed even if the hardware issue has not been resolved.

When block reconstruction is required due to a failed persistent storage device, all blocks may be reconstructed and rewritten to non-failed devices. Once this process occurs, the speed of the array recovers from a degraded condition without the need to re-write any data of the other non-failed persistent storage devices.

Duplication

In some cases, it may be desirable to have a single virtual address corresponding to multiple physical addresses. The same data is duplicated at each physical address.

In this manner, a read request may read from any of the physical addresses corresponding to the virtual address. If the block at one of the physical addresses fails, the read request may resolve from any of the other physical addresses. The failed block may be reconstructed using a block reconstruction technique noted above. This can avoid the delay of reconstruction while still providing that reconstruction can occur.

Alternatively, in some cases duplicates may be stored at once of more immediately following physical addresses. If a first physical address is unavailable, the data can be retrieved from the next physical address where the data is duplicated.

Thus, from the point of view of a user, the array may appear to never be slow, even if there is a failure of a persistent storage device within the array.

Update

Figure 7:
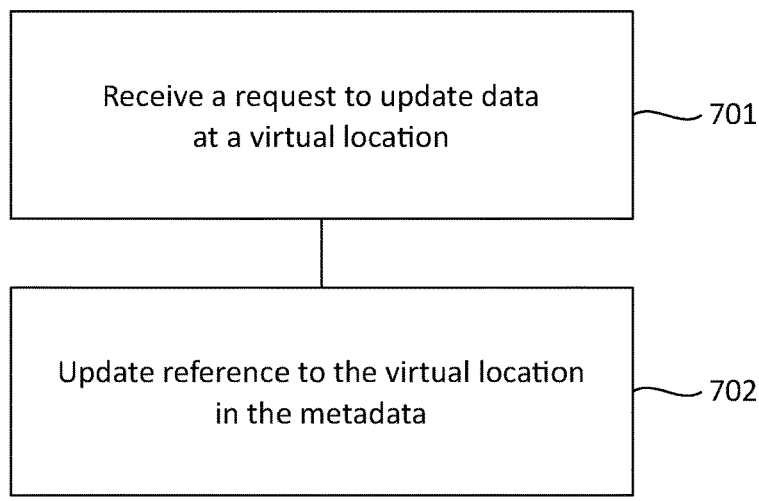
FIG. 7 shows an example approach for handling an update request.

FIG. 7 shows an example approach for handling an update request. This may be implemented in the same manner as the approach of FIG. 1.

At step 701, a request is received to update the data from a virtual location. The request may be received in the same manner as the request at step 101. For example, this may be received by a by a function call of the driver.

At step 702, references to the virtual location are removed from the metadata and the corresponding physical location is marked as dirty. This indicates that the physical location is free for future use.

Once the metadata is updated, there is no need for further persistent storage device operations. If the virtual location is not in the metadata, then the corresponding data at the physical location could not be retrieved. The physical location will eventually be reused after a garbage collection process has occurred.

Dirty Blocks

Updating data has been described in terms of selected blocks being marked as dirty. This may be implemented by each stripe maintaining a counter of the number of unused blocks in the stripe. When a block is marked dirty or is inaccessible (for example, due to a corresponding device failing), the number of gaps for the stripe may be incremented. When each data block is rewritten to the head (for example, during garbage collection), the number of gaps for the stripe may also be incremented.

Garbage Collection

When data indicated by a virtual location is updated, the corresponding physical location may be marked dirty indicating that the physical location can be reused. Thus, although data may initially be written sequentially on a persistent storage device, over time gaps in the sequence of data may appear.

One way to mitigate this is to periodically perform garbage collection. This aims to move data from the tail (that is, the earliest non-dirty block in the sequence of written blocks) to the head, until there are no gaps in the sequence.

Garbage collection may be performed in response to one or more garbage collection conditions being met.

A first garbage collection condition may be that a number of gaps on the persistent storage device exceeds a predetermined threshold. For example, where the number of gaps exceeds 1% of the capacity of the persistent storage device, the garbage collection condition may be met.

A second garbage collection condition may be that an activity level of persistent storage device falls below a threshold. For example, if the persistent storage device has not been used for several minutes, a garbage collection process may commence.

A third garbage collection condition may be that a free capacity of the persistent storage device falls below a threshold. For example, when the head counter gets near to the tail, it may be useful to try to recover some usable space.

A fourth garbage collection condition may be that a certain time period has passed. That is, it may be useful for a garbage collection process to commence periodically.

Additionally or alternatively, garbage collection may occur any time the driver is not processing a request and there exists one or more dirty blocks.

Figure 8:
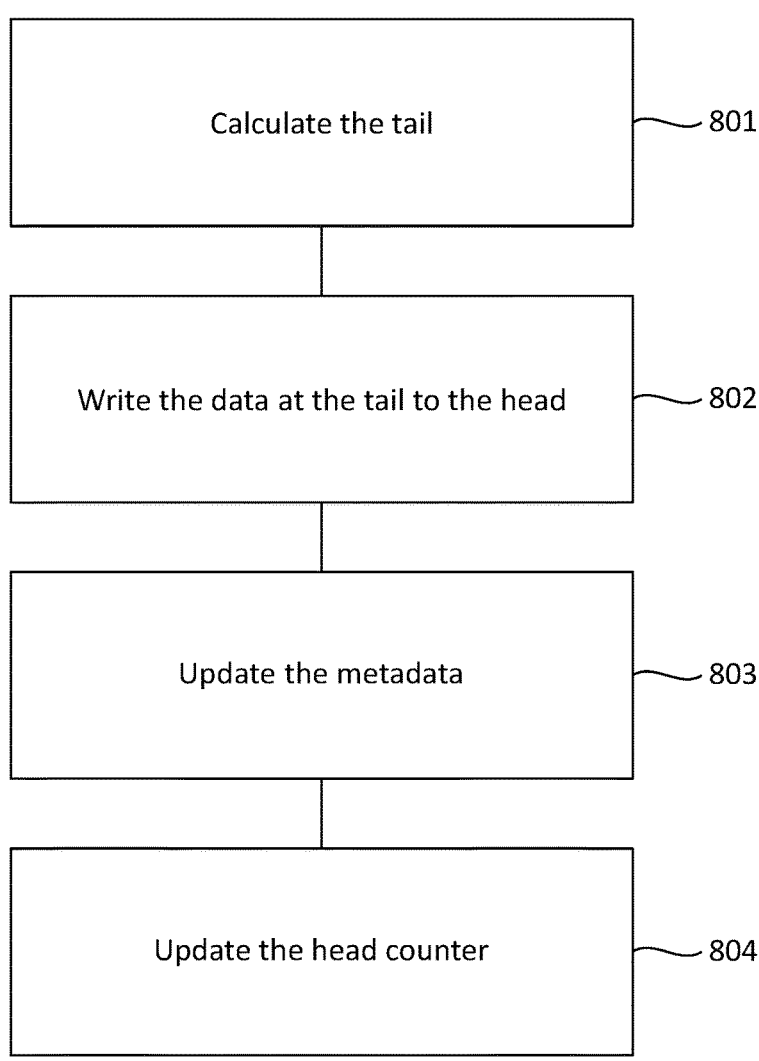
FIG. 8 shows an example approach for garbage collection.

FIG. 8 shows an example garbage collection process.

At step 801, the tail is calculated. The tail is the non-dirty block (that is, the block which is storing data) that is earliest in the sequence of written blocks. In other words, this is the oldest written non-dirty block.

At step 802, the data stored at the tail is written to the block indicated by the head counter.

At step 803, the metadata for the persistent storage device is updated. A new entry mapping the virtual address for the newly written block to the head counter replaces the previous entry for that block.

At step 804, the head counter is updated to reflect the next free block in the same manner as at step 105.

This process is repeated until one of the garbage collection conditions is no longer met or until there are no dirty blocks left. By iteratively moving blocks from the tail to the head, eventually there will be no remaining gaps.

Moreover, this process can be stopped at any time. Once step 804 terminates, the driver is ready to process further requests (including writing new blocks). In this way, garbage collection can be started and stopped without causing significant downtime.

In this manner, overall storage capacity can be recovered when data is updated without limiting the performance of other requests.

Example of Garbage Collection

FIG. 9 shows a worked example approach for performing garbage collection. This may be performed by the same driver as that which performs the method of FIG. 1, for example.

In FIG. 9, the driver is configured to use 2+1 parity (that is, 1 block of parity for each 2 blocks of data). In practice, the same approach may be applied to any level of parity. The head counter and mapping are omitted from FIG. 9.

At 900, the system is shown with data that has previously been written. Drive 0 has blocks marked dirty at physical locations 0 and 2. Drive 1 has a block marked dirty at physical location 1. Drive 2 has a block marked dirty at physical location 1. Blocks at locations 6 and 7 in all drives are empty. All other blocks in all drives have non-dirty data. The head counter is at physical location 6, since that represents the next free block. The tail is at 0, since the block at location 0 on drive 1 is the oldest non-parity non-dirty block.

At 901, the data in all non-dirty, non-parity blocks at the tail (location 0) has been moved to the head. The data at location 0 on drive 0 (a) is not moved, as it has been marked dirty. The data at location 0 on drive 2 (ab) is not moved, as it is parity data. Only the data at location 0 on drive 1 (b) is moved to the head. This has been moved to location 6 on drive 0. Location 6 is derived from the head counter (which indicates location 6 as the next free block). Drive 0 is derived by cycling through the starting drive of each stripe: since the stripe at location 5 started with drive 2, the stripe at location 6 starts with drive 0.

After the move, the mapping is updated so that the virtual location which previously mapped to location 0 on drive 1 now maps to location 6 on drive 0. Location 0 on drive 1 is marked as dirty, since the data is no longer needed, and the block can be reused. The head counter remains at 6. The tail moves to 2, since the next oldest non-dirty, non-parity data is at location 2 on drive 2. All of location 1 is dirty or parity on all drives (or in other words, the number of gaps in stripe 1 is 2).

At 902, the data in all non-dirty, non-parity blocks at the tail (location 2) has been moved to the head. The data at location 1 on drive 1 (c), location 1 on drive 2 (d), and location 2 on drive 0 (f) is not moved, as it has been marked dirty. The data at location 1 on drive 0 (cd) and location 2 on drive 1 (ef) is not moved, as it is parity data. Only the data at location 2 on drive 2 (e) is moved to the head. This has been moved to location 6 on drive 1. Location 6 is derived from the head counter (which indicates location 6 as the next free block). Drive 1 is derived from the previous written block in the stripe: since drive 0 was previously written to, drive 1 is the next drive in the sequence.

After the move, the mapping is updated so that the virtual location which previously mapped to location 2 on drive 2 now maps to location 6 on drive 1. Location 2 on drive 2 is marked as dirty, since the data is no longer needed, and the block can be reused.

Since the data in stripe 6 is now completed, parity data (be) is calculated and written to the remaining block in stripe 6 (that is, at location 6 on drive 1). The head counter moves to 7, since the next free block is in location 7. The tail moves to 3, since the next oldest non-dirty, non-parity data is at location 3 on drives 0 and 1.

Following this garbage collection process, all of locations 0, 1, and 2 on all drives is now free for use. Once stripe 7 is completed, the head counter will loop to stripe 0. Garbage collection therefore allows a persistent storage device or array of persistent storage devices to be more fully utilized.

Erasure Coding

As noted above, erasure coding is an approach in which a piece of data is encoded to form n data fragments. The original data is recoverable from any k data fragments (k≤n). Each data fragment is a w-bit word, where w can be any positive integer. For example, 1-bit and 8-bit are common. Generally, the higher the values for n and w, the more computationally intensive the erasure encoding and decoding process is.

First, the original data is segmented into w×k-bit data segments.

Second, k data fragments $d_1 \ldots d_k$ are formed by separating each data segment into k w-bit sized data words. These are data words.

Third, m=n−k data fragments $c_1 \ldots c_m$ are formed based on linear combinations of the data words with coefficients, such that:

$$c_i = a_{i,0}d_0 + \ldots + a_{i,k}d_k$$

where the arithmetic is defined over the Galois field $GF(2^w)$. These are coding words.

The data fragments can be stored in a stripe over an array of persistent storage devices, such that the data fragments are distributed over the persistent storage devices. In some cases, different persistent storage devices can hold different numbers of data fragments. Optionally, a checksum based on the data segment is also stored. Once all data segments are stored, a further checksum based on the original data can also be stored.

There are multiple ways to select the coefficients. One approach is to use a Cauchy Reed—Solomon code. This occurs by selecting n numbers in $GF(2^w)$ and partitioning them into two distinct sets $X=\{x_1, \ldots x_m\}$ and $Y=\{y_1, \ldots y_k\}$, with $X \cap Y = \emptyset$ such that:

$$a_{i,j} = \frac{1}{x_i + y_j}$$

where the arithmetic is defined over the Galois field $GF(2^w)$.

Once the data is stored, any k of the data fragments can be used to retrieve the data. For example, if the data words $d_1 \ldots d_k$ were obtained, these can be combined using the inverse of how they were segmented. If a coding word $c_i$ is used, a system of equations based on the equation noted above can be solved to obtain the missing data fragment.

In some situations, erasure encoding can be performed efficiently using one or more GPUs while the request itself is handled by one or more CPUs. This can result in improved overall performance.

Erasure encoding provides an approach which allows for high resilience and flexibility. The data fragments can be stored across multiple independent systems. If m or fewer fragments are lost, the corresponding data segment can be recovered, and thus the original data can be calculated. In addition, any k data fragments can be used to recover the original data, which allows any of the storing systems to respond.

System

Figure 10:
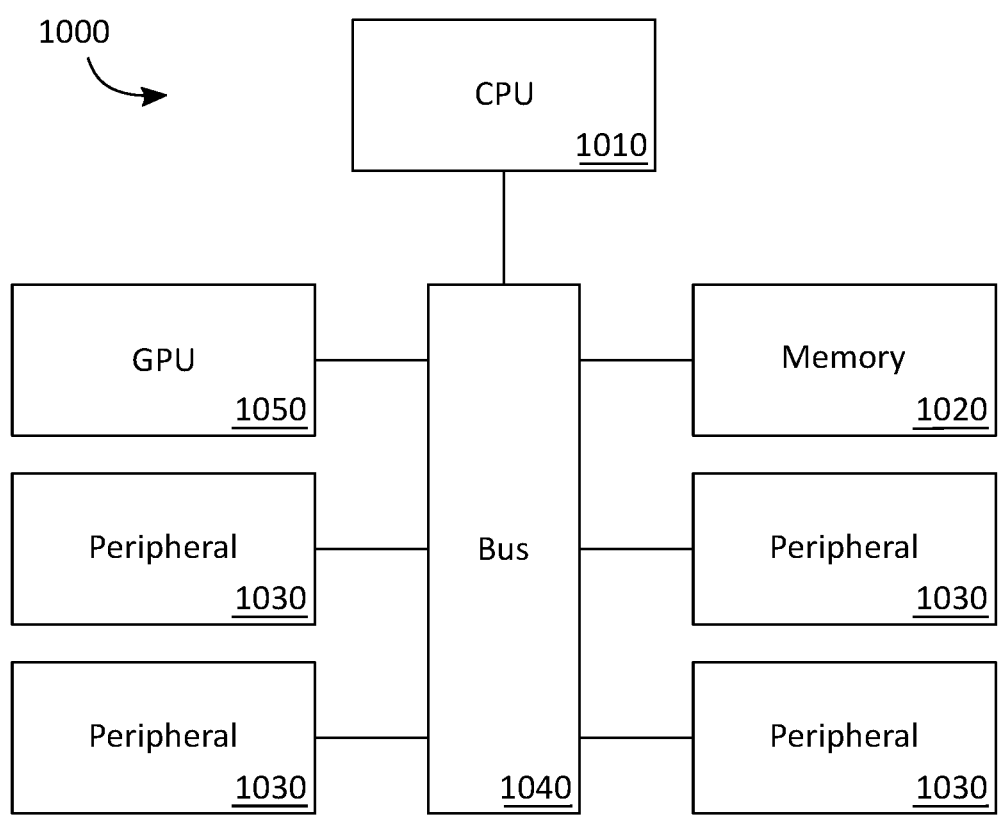
FIG. 10 shows a block diagram of an example computer system 900.

FIG. 10 shows a block diagram of an example computer system 1000.

The system 1000 comprises a CPU (central processing unit) 1010, a main memory 1020, one or more peripherals 1030, and a GPU (graphics processing unit) 1050. The CPU 1010, main memory 1020, peripherals 1030, and GPU 1050 are connected by a bus 1040. In the case of a PCIe (PCI Express) topology, the bus 1040 includes a root complex, and each of the peripherals 1030 and the GPU 1050 are PCIe endpoints. The GPU 1050 can communicate with the peripherals 1030 directly via the bus 1040. In some cases, more than one CPU 1010 and/or more than one GPU 1050 is provided.

The peripherals 1030 may include persistent storage devices (such as hard disk drives, solid state drives, or the like), storage controllers (such as RAID controllers), network controllers (such as network interface cards), switches (such as PCIe switches configured to connect further peripherals), or any of a variety of devices.

The peripherals 1030 and the GPU 1050 may have access to the main memory 1020 via the bus 1040. Through DMA (direct memory access), this can allow the peripheral 1030 or the GPU 1050 to read data to and write data from the main memory. This may involve copying the data from main memory 1020 to a memory local to the peripheral 1030 or the GPU 1050.

In some cases, the memory space for the CPU 1010 and the GPU 1050 can be shared via unified virtual memory. This allows for a pointer to a single memory address to be passed between the CPU and the GPU without the need to copy data between a main memory 1020 and a local memory.

Computer system 500 may be used to implement the methods noted above. For example, CPU 1010 or GPU 1050 may run a program which operates as a driver to one or more of the storage device peripherals 1030.

The storage device peripherals 1030 may be of different types. A relatively fast storage device peripheral 1030 may be used to store metadata (such as a mapping between virtual and physical locations) and an array of relatively slow storage device peripherals 1030 may be used to store the underlying data. In some cases, some of the storage device peripherals 1030 used to store the underlying data can be of mixed types, including one or more hard disk drives, solid state drives, RAM devices, or non-volatile RAM devices.

Interpretation

A number of methods have been described above. It will be appreciated that any of these methods may be embodied by a series of instructions, which may form a computer program. These instructions, or this computer program, may be stored on a computer readable medium, which may be non-transitory. When executed, these instructions or this program may cause a processor, such as a CPU or GPU, to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors. In some cases, one step may be performed by a first type of processor (for example, processing of large sets of data may be performed by a GPU) and another step may be performed by a second type of processor (such as metadata lookup being performed by a CPU).

The order of steps within methods may be altered, such that steps are performed out of order or in parallel, except where one step is dependent on another having been performed, or the context otherwise requires.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments and with reference to the drawings, the invention is not intended to be restricted to such details. Additional advantages and modifications will readily appear to those skilled in the art. Therefore, the invention in its broader aspects is not limited to the specific details, representative apparatuses and methods, and illustrative examples shown and described. Accordingly, departures may be made from such details without departure from the spirit or scope of the general inventive concept.

The invention claimed is:

1. A method comprising:
   receiving a request to write data at a virtual location;
   writing the data to a physical location on a persistent storage device of a plurality of persistent storage devices, wherein the physical location corresponds to a block within a stripe, the stripe comprising a plurality of blocks, each block being a physical location on each of the plurality of persistent storage devices;
   after completing the stripe by writing received data to the physical location of each of the plurality of persistent storage devices, updating a head counter; and
   recording a mapping from the virtual location to the physical location on the persistent storage;
   wherein the physical location on the persistent storage device corresponds to a next free block in a sequence of blocks on the persistent storage device.

2. The method of claim 1, wherein the virtual location and the physical location are not correlated.

3. The method of claim 1, wherein the physical location is determined by the head counter.

4. The method of claim 1, further comprising:
   receiving one or more requests to write further data to corresponding virtual locations;
   wherein the data and the further data form a data stream.

5. The method of claim 1, wherein writing the data to a second location occurs without performing a read from the persistent storage device.

6. The method of claim 1, further comprising:
   calculating a checksum for the data; and
   recording the checksum in metadata associated with the persistent storage device.

7. The method of claim 1, further comprising:
   determining that a garbage collection condition is met.

8. The method of claim 7, wherein the garbage collection condition comprises one or more of:
   a number of gaps on the persistent storage device exceeds a predetermined threshold;
   an activity level of the persistent storage device falls below a threshold;
   a free capacity of the persistent storage device falls below a threshold; or
   a time period has passed.

9. The method of claim 7, further comprising, in response to determining that a garbage collection condition is met:
   determining a block at the tail of the sequence of blocks;
   writing the data at the block to the head of the sequence of blocks; and
   updating the mapping based on the writing.

10. The method of claim 1, further comprising:
    determining that a predetermined number of blocks within the stripe have been written;
    calculating parity corresponding to the data written to the predetermined number of blocks within the stripe; and
    writing the parity data in one or more blocks within the stripe.

11. The method of claim 10, further comprising:
    retrieving a checksum for the retrieved data;
    calculating a checksum for the retrieved data; and
    comparing the calculated checksum with the retrieved checksum.

12. The method of claim 1, further comprising:
    determining that a block of a stripe is missing;
    reconstructing the data at the missing block from one or more other blocks in the stripe;
    writing the data to the head of the sequence of blocks; and
    updating the mapping based on the writing.

13. The method of claim 1, further comprising:
    determining that a persistent storage device among the plurality of persistent storage devices is unavailable; and
    wherein writing the data to a physical location on a persistent storage device comprises:
    writing the data to a physical location on a different one of the persistent storage devices.

14. The method of claim 1, wherein recording a mapping from the virtual location to the physical location on the persistent storage device comprises:
    identifying a mapping from the virtual location to a previous physical location; and
    updating the mapping to record a mapping from the virtual location to the physical location on the persistent storage device.

15. The method of claim 14, further comprising:
    recording a block corresponding to the previous physical location as dirty.

16. The method of claim 1, further comprising:
    writing a duplicate of the data to a subsequent physical location.

17. A system comprising:
    one or more processors; and
    a memory;
    wherein the memory comprises instructions which, when executed by the one or more processors, configure the one or more processors to perform the method of claim 1.

18. One or more non-transitory computer readable media comprising instructions which, when executed by one or more processors, cause the one or more processors to perform the method of claim 1.

* * * * *